(12) United States Patent
Rinkewich et al.

(10) Patent No.: US 6,324,906 B1
(45) Date of Patent: Dec. 4, 2001

(54) DOUBLE CHAMBER CONTAINER FOR METERING LIQUID FLOW

(76) Inventors: Isaac Rinkewich, 4822 Garden View Ter., Hightstown, NJ (US) 08520; Shlomo Rosinek, 41 Zahal Street, Kiron (IL)

( * ) Notice: Subject to any disclaimer, the term of this patent is extended or adjusted under 35 U.S.C. 154(b) by 6 days.

(21) Appl. No.: 09/618,402

(22) Filed: Jul. 18, 2000

(51) Int. Cl.[7] ............ G01F 03/24; G01F 01/20; G01F 01/00
(52) U.S. Cl. ............... 73/219; 73/215; 73/816
(58) Field of Search ............ 73/861, 219, 220, 73/149, 302, 215

(56) References Cited

U.S. PATENT DOCUMENTS

| | | | |
|---|---|---|---|
| 90,535 | * 5/1869 | Hargrave | 73/219 |
| 90,662 | * 6/1869 | Hargrave | 73/219 |
| 1,845,336 | * 2/1932 | Paulson | 73/219 |
| 3,561,427 | * 2/1971 | Profy | 128/2 |
| 3,624,828 | * 11/1971 | Edwards | 73/149 |
| 4,173,892 | 11/1979 | Khurgin | |
| 4,433,577 | 2/1984 | Khurgin | |

* cited by examiner

Primary Examiner—Herzon Williams
Assistant Examiner—Katina Wilson
(74) Attorney, Agent, or Firm—Robert L. Epstein; Harold James; James & Franklin, LLP

(57) ABSTRACT

The container includes a first chamber connected to the liquid source through an inlet port of a given cross-sectional area and a second chamber connected to a drain through an outlet port of at least equal size. The chambers are separated by a partition having a slot which has an elongated portion extending from the container floor in a direction generally parallel to the container side walls. The area of the elongated slot portion is approximately equal to the area of the inlet port. Liquid level or weight sensors generate signals representative of the quantity of the liquid level in the first chamber to a microprocessor to measure the flow rate. The signals are integrated over time to measure the total volume.

15 Claims, 3 Drawing Sheets

DOUBLE CHAMBER CONTAINER FOR METERING LIQUID FLOW

The present invention relates to apparatus for measuring liquid flow, and more particularly, to a container of unique design which permits accurate measurement of a wide range of different liquid flow rates on a "flow-through" basis.

The invention is particularly well suited for the measurement of milk yield of individual cows in a dairy farm. It can be used in conjunction with automatic milking machines of conventional design.

At one time, milk yields from individual cows were measured only on an occasional basis because taking accurate measurements is time consuming and requires additional equipment, as well as skilled personnel to operate the equipment. However, the daily measurement and recording of the milk yield for each cow in a herd can enhance the overall milk production significantly. Monitoring daily milk yield facilitates, among other things, efficient culling (selling of inefficient milk producers for beef), feed allocation on a selected basis (group or individual) and calved cows problems (including due date). Further, it is useful in detecting cows in heat, mastitis and other health problems.

The data obtained from daily measurement of milk yield enables the owner of the herd to detect problems quickly and to react to them by taking the necessary steps to maintain the optimum milk yield for each animal, either by altering the feed mix, administering medication, or the like. In spite of the usefulness of this data, to be practical, measurements must be capable of being made without imposing additional work load on the personnel, who are already fully occupied by caring for the livestock.

Apparatus for the measurement of quantities of liquid, such as milk, on a batch basis, are known. One example of such apparatus is disclosed in U.S. Pat. No. 4,173,892, entitled "Apparatus For Measurement of Quantity of Liquid in Container" issued on Nov. 13, 1979 to Boris Khurgin. That apparatus is designed to generate an electrical signal proportioned to the total milk volume in a container of glass or similar non-conducting material. The container is provided, on its exterior surface, with a pair of spaced, opposed electrodes which operate like the plates of a capacitor, with the container and its contents acting as a dielectric. The capacitance of the container is sensed and an electrical signal generated which is representative thereof.

The apparatus of the above mentioned patent has been found to produce very accurate results. However, its use requires considerable extra work and time on the part of the dairy personnel because it is a batch-type process, where measurement can be made only after all of the milk from the cow is in the container.

Metering during milking is not possible with the batch type capacitance measuring system because liquid flowing into the container, and thus between the capacitor surfaces, interferes with the accurate measurement of the capacitance which is a result of the liquid in the container. Moreover, such containers, because of their dimensions, require installations which are relatively tall.

In order to reduce the time and effort associated with making accurate measurements of daily milk yields for each cow, a flow-through liquid measuring apparatus was developed. That apparatus, in its simplest form, comprises two concentric vertical tubes. The exterior surface of each tube is provided with a metallic coating which acts as an electrode. Each electrode is electrically isolated from each other, so as to form a capacitor. The inner of the two concentric tubes is connected at its upper end to a pipe conveying milk from a orifice at its bottom which is dimensioned so as to maintain the liquid level in the tube above a restriction, as long as milk flows through the apparatus. The inner tube and the outer tube communicate through openings in the inner tube wall adjacent the restriction, causing the liquid to rise to the same level in both tubes.

The capacitance between the plates changes in proportion to the liquid level in the space between concentric tubes. The two electrodes are connected to an electronic circuit which generates a voltage output proportional to the capacitance. The milk level in the apparatus changes in proportion to the square of the milk flow rate through the restriction. The electronic circuit is designed to take the square root of the voltage output, in order to obtain a signal which is proportional to milk flow rate. This function is then integrated over the interval of time for the milking operation, so as to obtain the total milk yield.

For health reasons, milking machines and associated hardware designed to handle the flow of milk, must be capable of being sanitized and completely cleaned of all milk residue at regular intervals. Any equipment, such as that which measures the flow of milk, must also have this capability, so as to prevent contamination.

Aside from high initial cost, one significant drawback of the double tube design is the difficulty inherent in keeping the apparatus clean and sterile, as required. Another drawback, which is common to all types of apparatus employing opposed capacitor surfaces separated by a liquid, is that milk, or any other liquid, when it is receding, forms a thin layer or coating which remains on the interior tube walls for a certain period of time. This residue causes the instruments to falsely detect a higher capacitance than which corresponds to the actual milk level. Although this error is relatively small, it nevertheless causes inaccurate final results of the milk yield and, thus, this type of apparatus may not be suitable in cases where extremely accurate results are required.

On Feb. 28, 1984, U.S. Pat. No. 4,433,577 entitled "Apparatus For Metering Liquid Flow" issued to Khurgin et al. That patent discloses apparatus for measuring the rate of flow of a liquid from a source which overcomes the disadvantages of the flow-through capacitance type measuring system. The apparatus includes a container with an inlet tube connected to the liquid source. The container has an inlet port, connected to the inlet tube, through which liquid is supplied to the container. An orifice is situated at the bottom of the container to permit liquid to drain from the container at a known rate. An outlet tube is connected to the orifice. A conduit is provided to connect the container, at a point above the liquid therein, and the outlet tube, for equalizing the pressure therebetween. Means are provided for sensing the liquid level in the container and for generating a signal representative of the instantaneous rate of liquid flow through the container in accordance with the sensed liquid level.

A bypass conduit connects the container and the outlet tube. This conduit permits liquid situated above a given level in the container to bypass the orifice and flow directly into the outlet tube. The pressure equalizing conduit and the bypass conduit may be embodied in a single conduit connecting the upper portion of the container and the outlet tube.

The apparatus is designed for use in conjunction with suction means which form a portion of an automatic milking machine. When so used, the suction means and the inlet tube are connected, such that milk is drawn through the tube and into the container by the suction action of the machine.

The patent teaches that the apparatus may also be used in conjunction with an automatic cleaning system which includes a source of cleaning fluid. The apparatus includes means for connecting the container to the cleaning fluid source. Means are also provided for connecting the fluid cleaning source to the pressure equalizing conduit. In this manner, the entire apparatus may be cleaned efficiently.

The signal generating means disclosed in the patent includes means for detecting the level of the liquid surface in the container, means for generating an analog signal representative of the detected surface level, and means for converting the analog signal into a digital signal representative of the liquid flow rate. Further, means may be provided for integrating the digital signal over a given time period and for generating a signal representative of the total liquid volume flow through the container, during the time period.

One category of detecting means described in the patent is a plurality or array of sensors. The sensors are situated along the vertical surface of the container. Each of the sensors generates an output which represents the presence or absence of liquid adjacent to its location.

The apparatus of the patent employs a small round drain orifice. The orifice must have a relatively small diameter in order to maintain sufficient liquid level in low flow conditions. Under higher flow conditions, the liquid tends to back up, accumulating in the container and consequently a very large volume (24 inches high, 12 inches in diameter) cylindrical container is required. If, on the other hand, a more reasonable sized container was to be used, a larger orifice would be required and the apparatus would not function accurately under conditions of low flow.

Thus, when used to meter milk, the patented apparatus does not function accurately at the very beginning and end of the milking operation unless a very large volume container is used. The present invention overcomes this drawback by substituting an elongated flow passage with a larger flow area for the small round orifice of the patented devices thereby eliminating the need for a very large volume container.

It is, therefore, a prime object of the present invention to provide apparatus for metering liquid flow on a flow-through basis which is accurate under a wide range of flow rate conditions.

It is another object of the present invention to provide an apparatus for metering liquid flow on a flow-through basis which utilizes a double chamber container of reasonable size.

It is still another object of the present invention to provide a double chamber container for an apparatus for metering liquid flow which includes a partition having an elongated slot portion which extends from the container floor in a direction generally parallel to the side walls of the container.

It is another object of the present invention to provide apparatus useful for metering milk flow on a flow-through basis, which is accurate during the beginning and end of the milking operation.

In accordance with the present invention, liquid flow metering apparatus is provided including a liquid container having opposing side walls and a floor. A partition divides the container into first and second chambers. An inlet port is provided in the first chamber connected to a liquid source. An outlet port is provided in the second chamber connected to a drain conduit. Means are provided for equalizing the pressure between area of the first chamber above the liquid and the drain conduit. Means are provided for sensing the liquid level or liquid weight in the first chamber. The partition has a flow passage slot. The slot includes an elongated portion extending from the container floor, in a direction generally parallel to the side walls.

The cross-sectional area of the elongated slot portion is approximately the same as the cross-sectional area of the inlet port. The cross-sectional area of the outlet port is at least as large as the cross-sectional area of the inlet port.

The elongated slot portion is defined between spaced edges of the partition. In one preferred embodiment, the edges are substantially parallel to each other. In a second preferred embodiment, the edges are somewhat inclined relative to each other.

Thus, in the first preferred embodiment, the elongated slot portion is substantially rectangular. In the second preferred embodiment, the elongated slot portion has a gradually increasing width.

The slot also has a portion which extends in a direction generally perpendicular to the elongated slot portion. The purpose of this slot portion is to provide an overflow passage between the chambers. Hence, the slot portions together form a "T" shape.

To these and such other objects which may hereinafter appear, the present invention relates to a double chamber container for liquid flow metering, as described in detail in the following specification, recited in the annexed claims and illustrated in the accompanying drawings, in which like numerals refer to like parts and in which:

Figure 1:
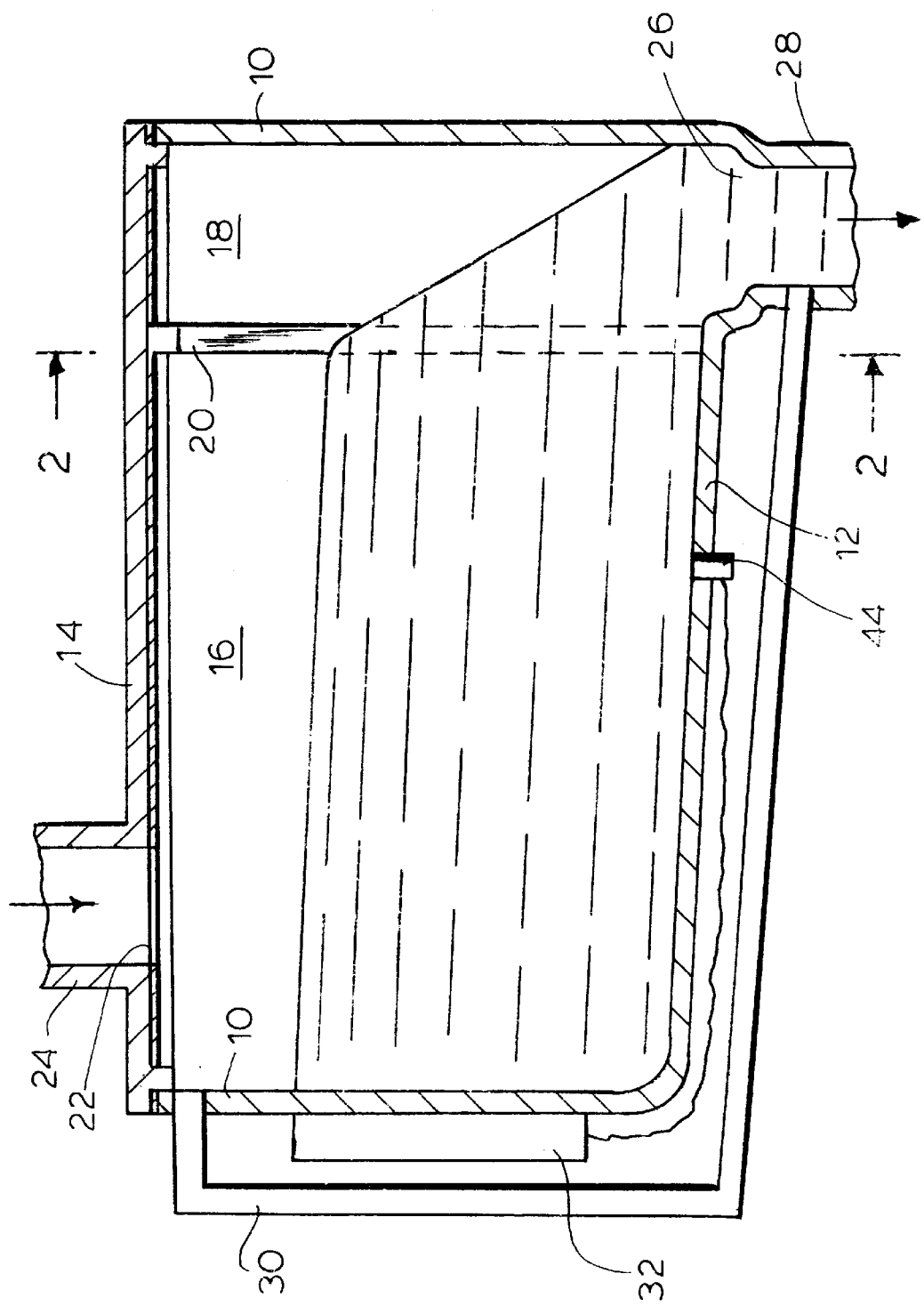
FIG. 1 is a cross-sectional view of the container of the present invention.

As seen in the drawings, the generally rectangular container, generally designated A, is defined by opposing side walls 10, a floor 12 and a removable, hermetically sealable top cover 14. Container A can be made of any rigid material such as metal, glass or plastic. Preferably, container A is 5 to 6 inches tall, 5 inches wide and 8 inches long.

The apparatus of the present invention is primarily designed for use with milk. The container material must therefore be able to withstand the cleaning and sanitization processes required for milk handling and to comply with food contact standards, such as FDA regulations.

The interior of container A is divided into a first or inlet chamber 16, about 6½ inches long, and a second or outlet chamber 18, about 1½ inches long, by an interior partition 20. Partition 20 extends from floor 12 to top cover 14, between side walls 10.

Top cover 14 has an inlet port 22 aligned with chamber 16. Inlet port 22 is connected to a source of liquid (not shown) by inlet conduit 24.

Container floor 12 gently slopes towards an outlet port 26, at the bottom of chamber 18. Outlet port 26 is connected to drain conduit 28 which in turn may be connected to an automatic milking machine.

Affixed to the exterior of side wall 10 of chamber 16 are a plurality liquid level height sensors and a microprocessor shown as block 32. The liquid level height sensors can be of any known type, such as those described in the aforementioned U.S. Pat. No. 4,433,577. Alternatively, a weight sensor or scale, the output of which can be converted to comparable values, may be employed.

The sensors generate signals representative of the quantity of liquid in chamber 16 at any given time. These signals are fed to the microprocessor which integrates the signal over time to measure the total volume of liquid which passes through the container for each cow. The output of each cow is recorded in the microprocessor or other equipment attached to the microprocessor.

Figure 2:
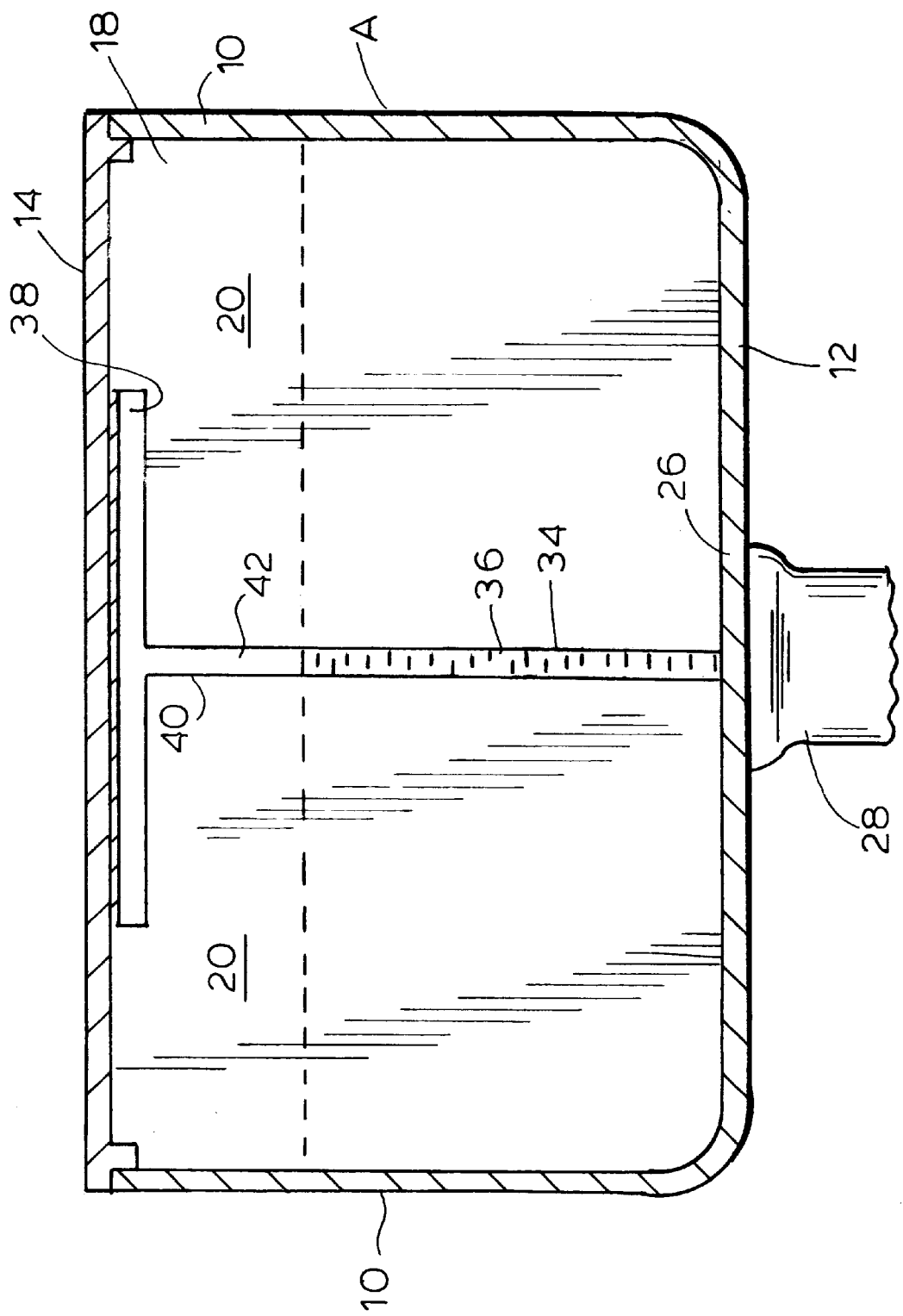
FIG. 2 is a cross-sectional view taken along line 2—2 of FIG. 1, illustrating a first preferred embodiment of the container of the present invention.

As seen in FIG. 2, in the first preferred embodiment, partition 20 is provided with a flow passage slot 34 which permits liquid to flow from chamber 16 to chamber 18. Slot 34 has a lower elongated portion 36 which extends from floor 12 towards top cover 14, in a direction generally parallel to side walls 10. Slot 34 has a upper portion 38 which extends across the top of the partition, in a direction generally perpendicular to portion 36. Hence, the slot has a "T" shape.

Slot portion 36 is defined by edges 40, 42 of partition 20. In the first preformed embodiment shown in FIG. 2, edges 40, 42 are generally parallel to each other and hence slot portion 36 has a uniform width and is generally rectangular in shape.

Figure 3:
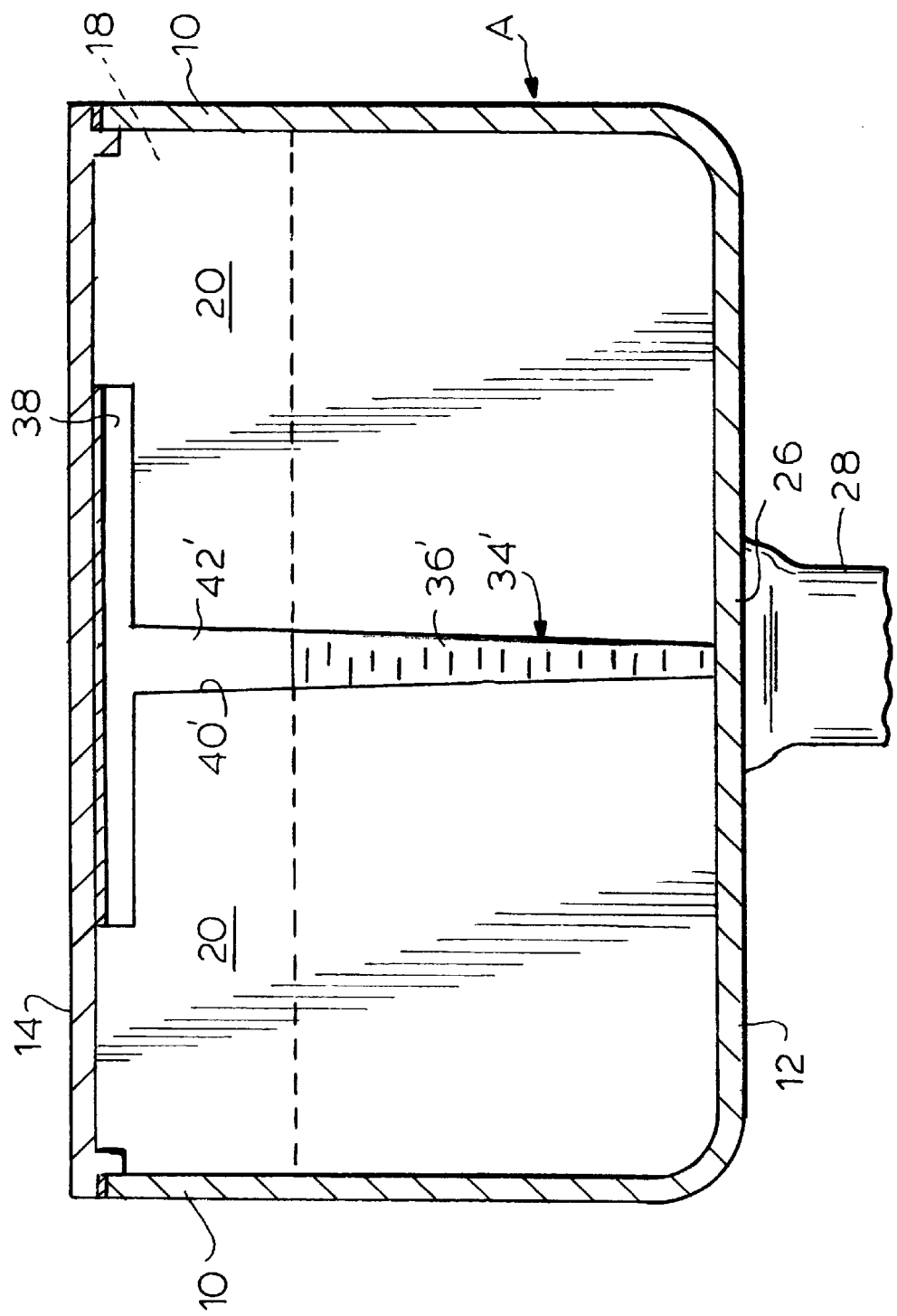
FIG. 3 is a view similar to FIG. 2, illustrating the second preferred embodiment of the container of the present invention.

In the second preferred embodiment, illustrated in FIG. 3, slot 34' has a elongated portion 36' defined between partition edges 40' and 42'. In this embodiment, edges 40' and 42' are inclined relative to each other such that the width of slot portion 36' increases gradually towards the top of the container.

Upper portion 38 of the slot is normally above the liquid level and hence has no effect on liquid flow between the chambers. This portion of the slot functions as an overflow bypass, in the event that liquid builds up in chamber 16 faster than it can flow through the slot portion 36.

Inlet port 22 has a given cross-sectional area. The cross-sectional area of elongated slot portion 36 is selected to be approximately equal to that of the inlet port. The cross-sectional area of the outlet port 26 is at least as large as that of the inlet port 22.

For most types of sensors, it is important that the pressure above the liquid surface in chamber 16 be equal to the pressure in drain conduit 28. Conduit 30 is provided for this purpose. It connects the upper portion of chamber 16 with drain conduit 28, immediately below outlet 26.

As an alternative to conduit 30, with certain types of sensors, a different way of taking into account pressure differences may be utilized. In this case, a pressure sensor 44 provided in floor 12 is used. Sensor 44 is connected to microprocessor 32. Sensor 44 permits the microprocessor to calculate the instantaneous pressure differential between the liquid in chamber 16 at the surface thereof and at floor 12. This value is then used to calculate the flow rate.

Container A is relatively short, having a height of only 5–6 inches, with a rectangular cross-section preferably 5 inches wide and 8 inches long. Chamber 16 is larger in volume than chamber 18. However, compared to the system of U.S. Pat. No. 4,433,577, which requires a 24 inch high, 12 inch diameter single chamber cylindrical container with a round orifice having a maximum diameter of ⅜ inch, when it is designed for a flow of 20 liters per minute, the overall size of the container of the present invention is much smaller. This is possible because of the double chamber design and because of the elongated flow passage slot.

The dimensions of the flow passage slot are selected to (a) keep the level of the liquid in chamber 16, during average flow conditions, approximately mid-way between floor 12 and top cover 14; (b) keep the overall height of the container as small as possible, while accommodating a specified maximum flow; (c) insuring that slot portion 38 is large enough to accommodate any expected overflow; and (d) keeping the bottom of the elongated slot portion 36 as small as possible to facilitate accurate detection under low flow conditions.

It will now be appreciated that the present invention relates to a container for metering liquid flow which is capable of accurate measurement over a wide range of different flow conditions. This advantage is obtained through the use of a double chamber container with an elongated flow passage slot which extends from the floor of the container in a direction generally parallel to the side walls of the container.

While only a limited number of preferred embodiments of the present invention have been disclosed for purposes of illustration, it is obvious that many variations and modifications could be made thereto. It is intended to cover all of these variations and modifications which fall within the scope of the invention, as defined by the following claims:

We claim:

1. Liquid flow metering apparatus comprising a liquid container having opposing side walls and a floor, a partition dividing said container into first and second chambers, an inlet port in said first chamber connected to a liquid source, an outlet port in said second chamber connected to a drain conduit, means for sensing the quantity of liquid in said first chamber and for calculating the total liquid volume, said partition comprising a slot including an elongated liquid flow portion extending from said floor in a direction generally parallel to said side walls.

2. The apparatus of claim 1 further comprising means for equalizing the pressure between the area of the first chamber above the liquid and the drain conduit.

3. The apparatus of claim 1 wherein the cross-sectional area of said elongated slot portion is approximately the same as the cross-sectional area of said inlet port.

4. The apparatus of claim 3 wherein the cross-sectional area of said outlet port is at least as great as the cross-sectional area of said inlet port.

5. The apparatus of claim 1 wherein said elongated slot portion is defined between spaced edges of said partition.

6. The apparatus of claim 5 wherein said partition edges are substantially parallel to each other.

7. The apparatus of claim 5 wherein said partition edges are inclined relative to each other.

8. The apparatus of claim 1 wherein said elongated slot portion is substantially rectangular.

9. The apparatus of claim 1 wherein said elongated slot portion has a gradually increasing width.

10. The apparatus of claim 1 wherein said slot has a portion extending in a direction generally perpendicular to said elongated portion.

11. The apparatus of claim 10 wherein said slot has a "T" shape.

12. The apparatus of claim 1 wherein said container is longer than it is tall.

13. The apparatus of claim 1 wherein said first chamber has a larger volume than said second chamber.

14. The apparatus of claim 1 wherein said sensing means comprises liquid level sensing means.

15. The apparatus of claim 1 wherein said sensing means comprise liquid weight sensing means.

* * * * *